Figure 13:
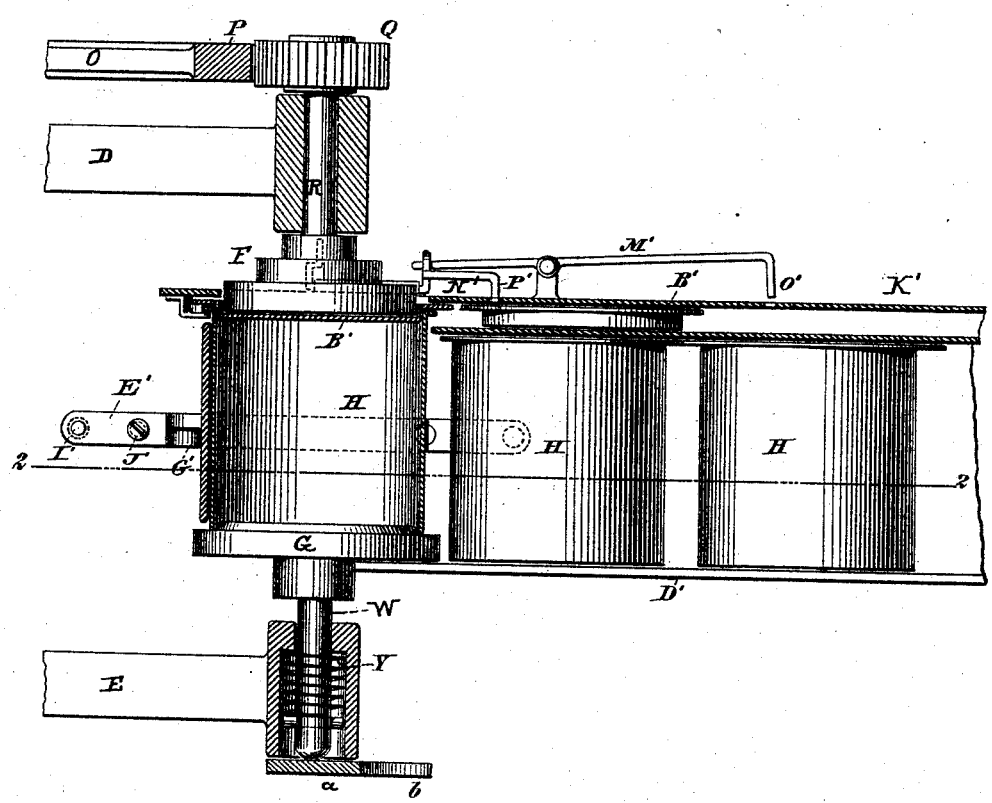

(No Model.) 4 Sheets—Sheet 1.
W. HIPPERLING.
MACHINE FOR MANUFACTURING TIN CANS.
No. 487,270. Patented Dec. 6, 1892.
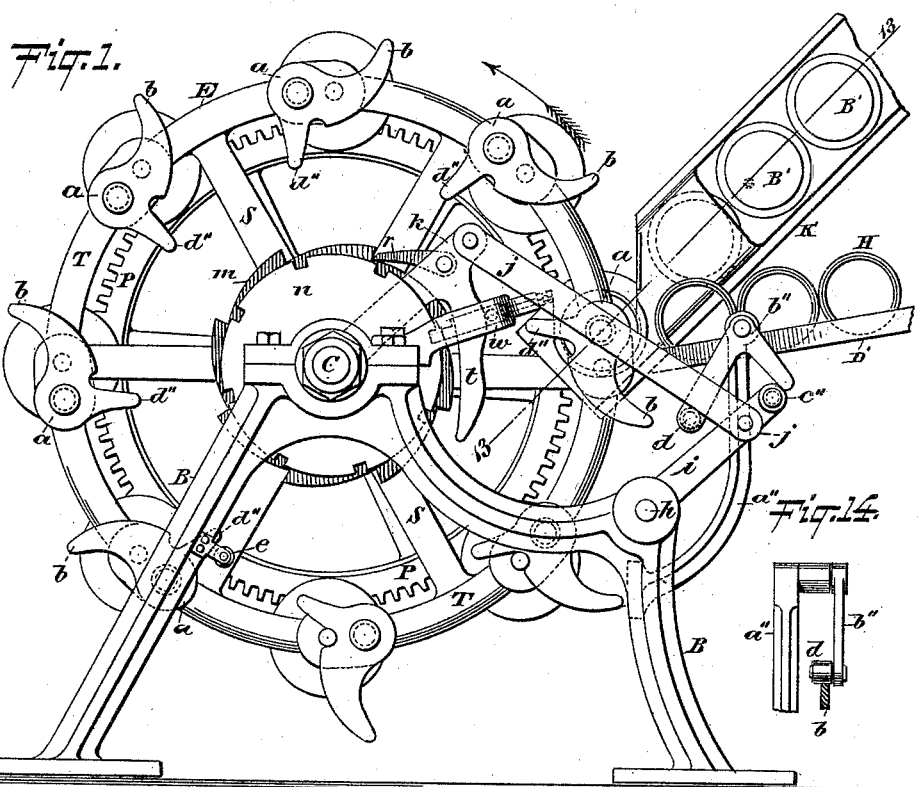
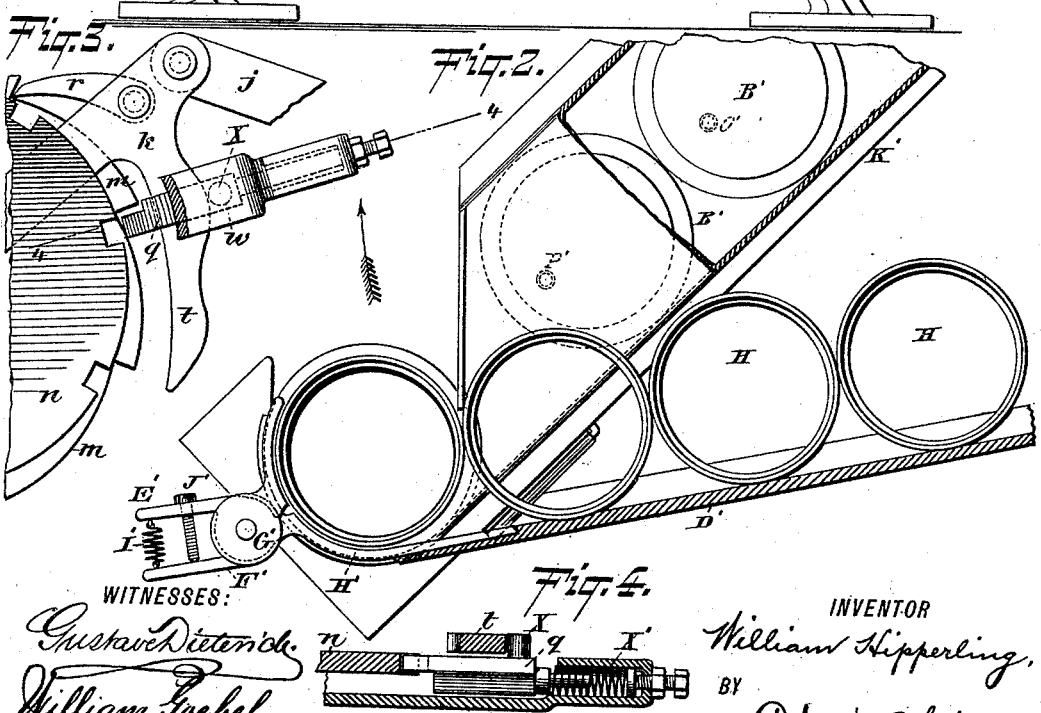
WITNESSES:
Gustave Dieterich.
William Goebel.
INVENTOR
William Hipperling,
BY
Chas. C. Gill
ATTORNEY.

(No Model.) 4 Sheets—Sheet 2.
W. HIPPERLING.
MACHINE FOR MANUFACTURING TIN CANS.
No. 487,270. Patented Dec. 6, 1892.
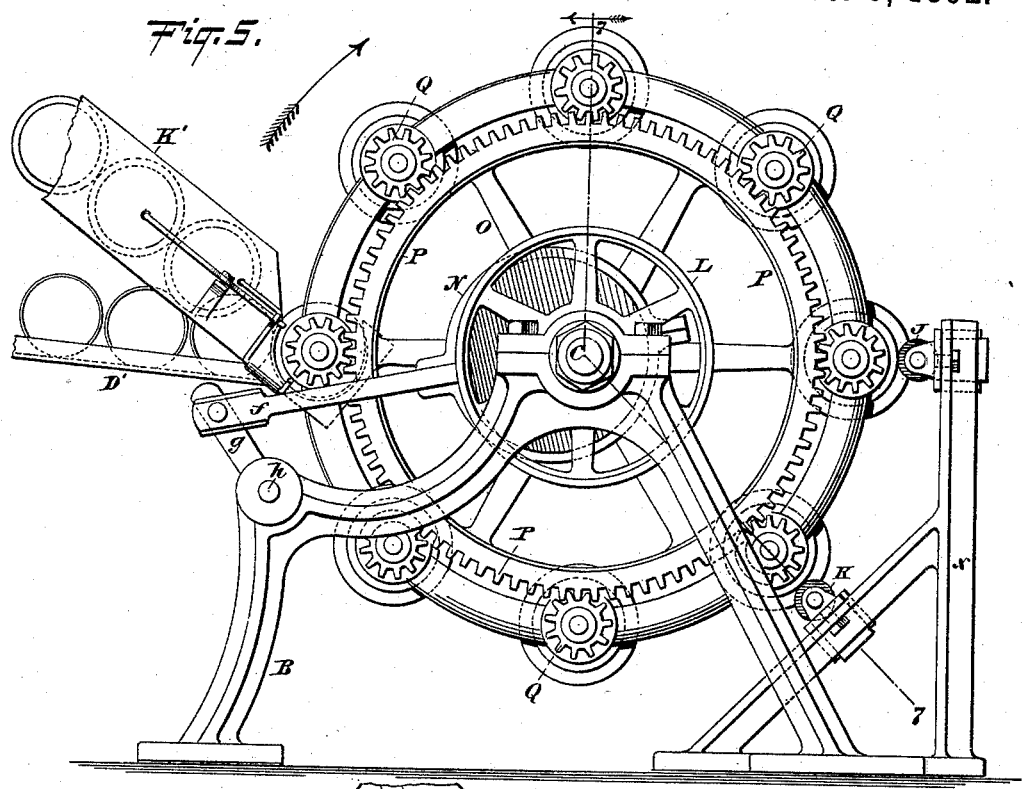
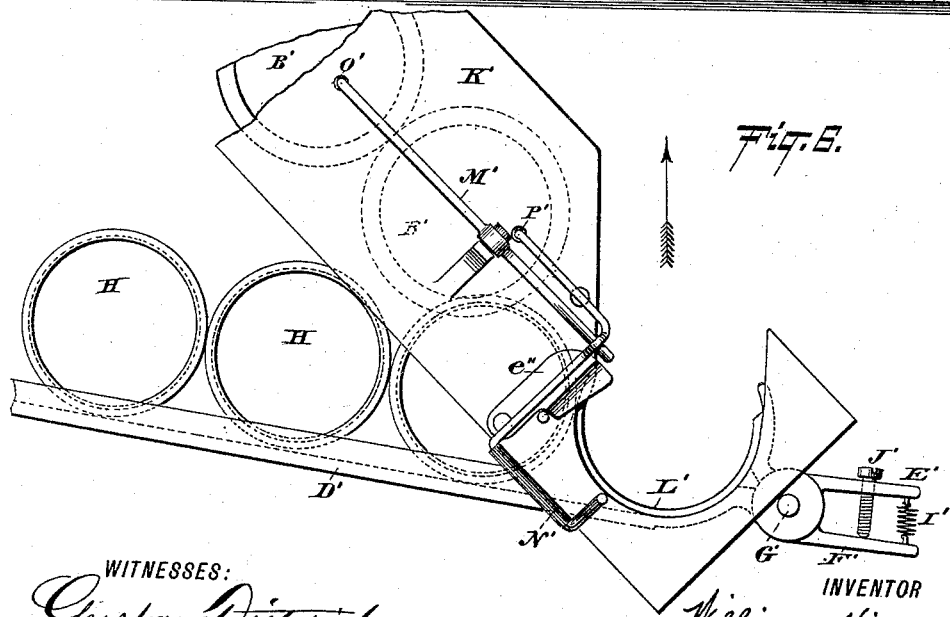
WITNESSES:
Gustave Dieterich
William Goebel.
INVENTOR
William Hipperling,
BY
Chas. C. Gill
ATTORNEY.

(No Model.) 4 Sheets—Sheet 3.
W. HIPPERLING.
MACHINE FOR MANUFACTURING TIN CANS.
No. 487,270. Patented Dec. 6, 1892.
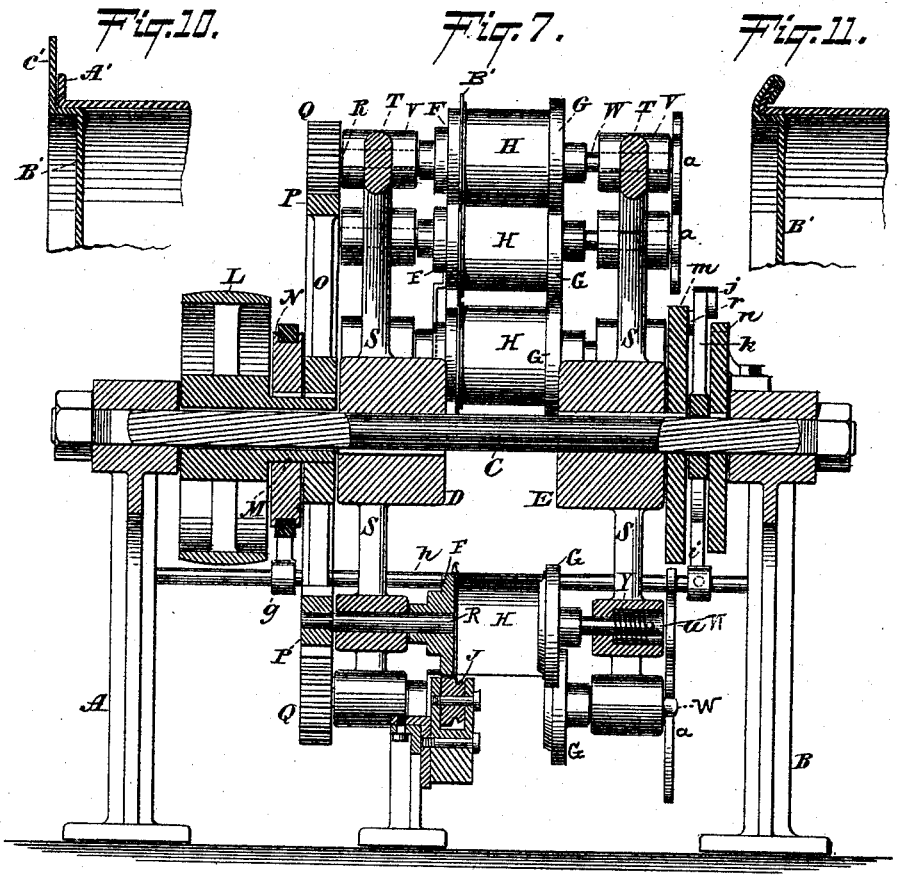
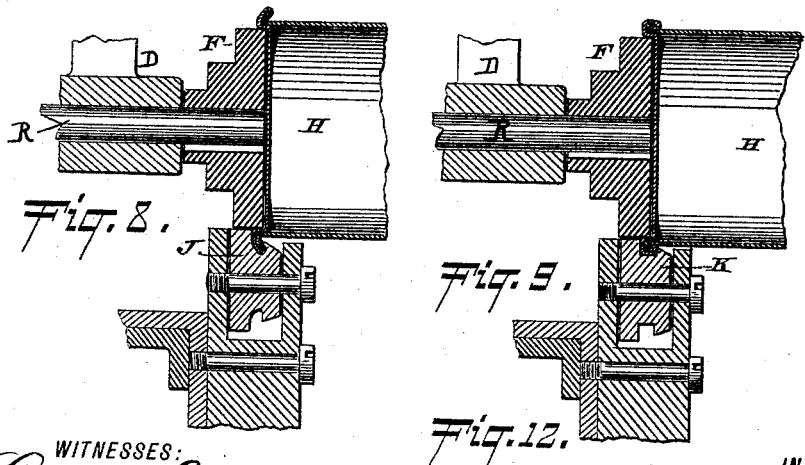
WITNESSES:
Gustave Dieterich
William Goebel.
INVENTOR
William Hipperling.
BY
Chas. C. Gill
ATTORNEY.
THE NORRIS PETERS CO., PHOTO-LITHO., WASHINGTON, D. C.

(No Model.)  4 Sheets—Sheet 4.
W. HIPPERLING.
MACHINE FOR MANUFACTURING TIN CANS.
No. 487,270.  Patented Dec. 6, 1892.

UNITED STATES PATENT OFFICE.

WILLIAM HIPPERLING, OF NEW YORK, N. Y., ASSIGNOR TO STEPHEN A. GINNA, OF PLAINFIELD, NEW JERSEY, AND RICHARD A. DONALDSON, OF BROOKLYN, NEW YORK.

MACHINE FOR MANUFACTURING TIN CANS.

SPECIFICATION forming part of Letters Patent No. 487,270, dated December 6, 1892.

Application filed June 5, 1890. Serial No. 354,330. (No model.)

*To all whom it may concern:*

Be it known that I, WILLIAM HIPPERLING, a citizen of the United States, and a resident of New York, in the county of New York and State of New York, have invented certain new and useful Improvements in Machines for the Manufacture of Tin Cans, of which the following is a specification.

The invention relates to improvements in machines for the manufacture of tin cans, and particularly to mechanism for seaming the ends in the can.

The invention has for its object the rapid feeding of the can bodies and bottoms to the machinery by which each bottom and body are held in proper relation to each other and carried against seaming-rollers which accomplish the proper folding of the flanges to form double seams.

The invention will be more fully understood from the detailed description hereinafter presented, reference being had to the accompanying drawings, in which—

Figure 1 is an end elevation of a machine constructed in accordance with the invention; Fig. 2, an enlarged sectional view of the chutes for feeding the can bodies and bottoms to the machine, said section being on the dotted line 2 2 of Fig. 13; Fig. 3, an enlarged detached view, partly in section, of the pawl-and-ratchet mechanism, hereinafter described, for imparting an intermittent motion to the revolving frames between which the cans are clamped during the process of forming the double seams; Fig. 4, a sectional view on the dotted line 4 4 of Fig. 3; Fig. 5, an end elevation of the machine; Fig. 6, an enlarged side elevation of the chutes for feeding the can bodies and bottoms to the machine, this view showing the side of said chutes opposite to that illustrated in Fig. 2; Fig. 7, a longitudinal section of the machine on the dotted line 7 7 of Fig. 5; Fig. 8, a longitudinal section through one can and its adjacent clamping-head with the forming-roller for completing the first step in the operation of double-seaming the bottom in the can; Fig. 9, a like view of the can-body with its clamping-head and the roller for performing the final step in the operation of double-seaming the bottom in the can. Fig. 10 is a detached sectional view of a portion of the can body and bottom, illustrating the flanges which are to be formed into the double seam, on an enlarged scale. Fig. 11 is a like view of same, illustrating the position of said flanges after they have been subjected to the action of the forming-roller illustrated in Fig. 8, which performs the first step in the operation of double-seaming; Fig. 12, a like view of same, showing the position of the flanges after they have been formed in the double seam by the action of the seaming-roller illustrated in Fig. 9; Fig. 13, an enlarged sectional view through the chute for feeding the can-bodies to the machine, the section being on the dotted line 13 13 of Fig. 1; and Fig. 14 is a detached edge view of the bell-crank $b''$, hereinafter referred to.

In the drawings, A B represent the frames or standards of the machine, in the upper ends of which the ends of the horizontal shaft C are journaled.

Upon the shaft C are mounted the revolving wheels or frames D E, which carry the clamping-heads F G, respectively, by which the can-bodies H and the can-body bottoms B' are held in proper relation to each other and carried against the seaming-rollers J K, respectively, by which the said bottoms are double-seamed to the can-bodies. The particular construction of the revolving wheels or frames D E with the clamping-heads F G will be more specifically referred to hereinafter.

Upon the shaft C is also mounted the driving-wheel L of usual form and provided with the sleeve M, which enters the hub of the eccentric N and wheel O, as shown more clearly in Fig. 7, the said eccentric N and wheel O being keyed upon the sleeve M, so as to have a continuous movement with the belt-wheel L, by which power is applied to the operative mechanism. The wheel O is provided with a toothed rim P, which engages the series of pinion-wheels Q, mounted on the axles R, carried in apertures provided equidistant from each other in the rim of the revoluble frame or wheel D. The form of the gear-wheel O and the method of its engagement with the series of pinion-wheels Q is more clearly illustrated in Fig. 5.

The series of axles R, carried by the frame or wheel D, have upon their inner ends the clamping-heads F, hereinbefore referred to, and are capable of rapid revolution in the apertures containing them in the rim of said wheel, the purpose being, through the medium of the gear-wheel O and pinions Q, to impart from the belt-wheel L a constant rotary movement to the clamping-heads F independent of the motion of the revolving frame or wheel D. It will be noted that upon power being applied to the belt-wheel L, the wheel O being keyed through the sleeve M thereto, the toothed rim P will have a constant revolution against the pinion-wheels Q, and that as a consequence all of said pinion-wheels will revolve and carry the clamping-heads with them without regard to whether the wheel or frame D is stationary or revolving.

The wheels D E consist of the hubs, as shown in Fig. 7, together with the radial spokes S, rim T, and hubs V, cast on said rim and provided with apertures through which the axles R and W respectively pass. The axles R have been referred to hereinbefore as carried by the wheel D and having upon their outer end the pinion-wheels Q and on their inner end the clamping-heads F. The axles W are carried by the wheel E, one axle being located in each of the equidistant hubs D and carrying upon its inner end the clamping-head G and having upon its outer end within the hubs V the coiled spring Y, as shown in Figs. 7 and 13, by which a tension is created in the axle outward from the can-body H. Upon the outer side of the wheel E is pivoted the series of latches $a$, (shown more clearly in Fig. 1,) whose purpose is to effect the inward movement of the axles W and clamping-heads G toward the can-bodies H at such times as it may be desired to effect the clamping of the can-body and its bottom between the heads F G.

In Fig. 1 all of the latches $a$ at the upper and left-hand side of the wheel E are illustrated in their closed position upon the outer ends of the axles W, and in Figs. 7 and 13 the relation of the latch $a$ with the spring Y and axle W is illustrated in a sectional view. When the latch $a$ is moved so that its arm $b$ will pass over the outer end of the axle W, said axle is forced inward and the clamping-head G is forced against the can-body H, and after the seaming operations have been concluded the said latch $a$ is moved on its pivot so as to relieve the arm $b$ thereof from contact with the end of the axle W, and at such time the spring Y will force the head G toward the wheel E and away from the can-body H, thus releasing the latter and permitting it to escape from the machine. During the revolution of the wheels D E the latches $a$ will, in the manner hereinafter particularly described, first come into contact with the wheel or pin $d$, which will operate to close the arm $b$ of said latches upon the ends of the axles W, and thereafter when it is desired to release the can bodies said latches will come into contact with the wheel or pin $e$, which will reverse the movement of the latch and release its arm $b$ from contact with said axles W, permitting the latter, with the heads G, to spring back to their former position and release the can-bodies.

The wheels or frames carrying the clamping-heads F G receive an intermittent motion from the belt-wheel L by mechanism hereinafter described, while the gear-wheel O and pinions Q have a continuous movement. The eccentric N is keyed upon the sleeve M, forming a part of the belt-wheel L, as illustrated in Fig. 2, and its rod $f$ (see Fig. 5) extends outward and is pivotally secured to the arm $g$, affixed at its lower end upon the rock-shaft $h$, which extends from the frame A to the frame B of the machine and carries adjacent to the frame B the arm $i$, (see Fig. 1,) to the upper end of which is pivoted the link $j$, which connects said arm $i$ with the pawl-arm $k$, the latter being held at its inner end upon the shaft C.

Upon the shaft C at one side of the arm $j$ is keyed to the wheel E the ratchet-wheel $m$, and upon the opposite side of said arm $j$ is keyed the ratchet-wheel $n$, the square teeth of which correspond in position with the teeth of the ratchet-wheel $m$ and are engaged by the sliding dog $q$ at such intervals as it may be desired to lock the wheels D E, so as to prevent their further revolution. The teeth of the wheel $m$ are engaged by the pawl $r$, pivoted to the arm $k$, as shown more clearly in Fig. 1, for the purpose of effecting the intermittent rotation of the wheel E. It will be observed that the teeth of the wheel $m$ are equidistant from each other and that with every forward thrust of the pawl $r$ the ratchet-wheel $m$ and wheel E make a partial revolution. At the end of each forward thrust of the pawl $r$ the dog $q$ engages a tooth or notch in the wheel $n$ and locks the wheel $n$ and wheel $m$ while the pawl $r$ is sliding back to its former position, so as to be ready to engage another tooth of the wheel $m$ upon its next forward thrust. The arm $k$ carries the cam-arm $t$, which controls the sliding movement of the dog $q$, the dog being supported in a frame $w$, connected with the side B of the machine, and being provided with the roller X, which is retained in contact with the arm $t$ by the spring X', as shown in Fig. 4. At the end of the forward thrust of the arm $k$ the cam-arm $t$ permits the dog $q$ to move inward sufficiently to enable its point to enter one of the notches of the wheel $n$, where it remains until the arm $k$ has returned to its former position preparatory to again rotating the wheel $m$ and through it the shaft C and wheels F G. The forward thrusts and reverse movements of the pawl $r$ and its carrying-arm $k$ are effected from the eccentric N through the medium of its rod $f$, arm $g$, rock-shaft $h$, arm $i$, and link $j$, above described, and at each forward thrust of said pawl $r$ and arm $k$ the wheel $m$, wheel $n$, shaft C, and wheel-frames D E have a definite revolving movement, while during the reverse movement of said pawl $r$ and arm $k$ the said shaft and wheels are held stationary by the engagement of the dog $q$ with the wheel $n$.

Adjacent to the upper end of the arm $i$ is pivotally secured to a frame $a''$ the bell-crank $b''$, one arm of which when in its normal position, as shown in Fig. 1, rests upon the roller $c''$, carried at the upper end of the arm $i$, while the other arm of said bell-crank $b''$ carries the roller $d$ and is in position to be elevated by the arm $i$ coming into contact with it during the forward thrust of the arm $k$, carrying the pawl $r$. The roller $d$ projects inward toward the wheel or frame E, and its purpose is at the proper time to form an obstruction against which the arm $b$ of the latches $a$ will strike during the revolution of the wheel E and be thereby depressed, causing the latches to turn on their pivots and move over the outer ends of the axles W, as hereinbefore described, the object being to force said axles W and the heads G, carried by them, inward toward the can-body H and to lock them in that position until such time as it may be desired to effect the release of the can-body. During the forward thrust of the pawl-arm $k$ and the arm $i$ the longer arm of the bell-crank $b''$ will be turned upward on its pivot without coming into contact with anything during such movement; but during the return of the pawl-arm $k$ and arm $i$ the longer arm of said bell-crank will before regaining its normal position come into contact with and depress the arm $b$ of the latch $a$, which at the time will be extended outward and will have reached a position adjacent to the discharge ends of the chutes D' K'. The inward movement of the axle W and head G under the action of the latch $a$ effects the securing of a can body and bottom together between the heads F G which immediately thereafter are carried upward from their position at the end of the chutes D' K' by the revolving of the wheel-frames D E, and during their movement from the chutes D' K' said heads F G carry the can body and bottom clamped between them, and while rapidly revolving under the action of the gear-wheels P Q move the flanges A' C' of said can body and bottom against the seaming-rollers J K, by which the double-seaming is effected. Thereafter said can-body, with its bottom secured therein, is released from the heads F G by the contact of the arm $b$ of the latches $a$ with the roller $e$ secured in position to meet said arm $b$ during the movement of the wheel-frames D E, said contact of the arm $b$ with the roller $e$ causing the latch $a$ to turn upon its pivot sufficiently to leave the outer end of the axle W exposed, as shown at the lower latch $a$ in Fig. 1, and permit the spring Y to force the said axle W and head G outward from the can-body and permit the latter to escape.

The seaming-rollers (lettered J K and shown on an enlarged scale in Figs. 8 and 9) are secured to the frame $x$, (shown in Fig. 5,) which may be of any usual form which will firmly support the seaming-rollers, which are also of the usual well-known form. The can-body H, having the outwardly-turned flange A' at its lower edge and containing the bottom B', having the outwardly-extending flange C', upon being carried between the rapidly-revolving heads F G against the seaming-roller J will have the outer edge of the flange C' turned over upon the flange A' and both said flanges turned inward a definite distance toward the can-body, as shown by the enlarged view in Figs. 8 and 11. After the can-body H, with its bottom I, has left the seaming-roller J it is carried between the heads F G against the roller K, where the flanges A' C' are turned inward and flattened against the edge of the can-body, as shown in Figs. 9 and 12, the double-seaming being thus completed, after which the latch $a$, which held the head G against the can-body, comes into contact with the wheel $e$ and is turned from the end of the axle W to permit the spring Y to retract the head G and release the can.

The can-bodies are fed to the machine upon the inclined chute D', having at its end the arms E' F', respectively, which are hinged together on the pivot G' and the one lettered E' of which is rigidly secured at its inner end to the bottom of the chute D'. The arm E', secured to the chute D', as shown in Fig. 2, forms an extension to said chute and constitutes at H' a cup or pocket to hold one can-body. The arm F' at its inner end curves upward, forming an extension of the cup or pocket H' for the can-body and at its outer end is connected by a spring I' with the arm E'. The outer end of the arm E' is provided with the stop J' in the form of a screw by which the said arms are preserved in their proper relation to each other and may be adjusted toward or from each other, so as to adapt the pocket H' for different sizes of cans. When a can is being drawn upward from the pocket H', its contact with the upper end of the arm F' moves said end outward, so as not to obstruct the passage of the can, and after the can has passed beyond said upper end the spring I' draws the arm F' to its normal position against the stop J'. The relation of the outer ends of the arms E' F' to each other controls the size of the pocket H'. When said outer ends are permitted to approach each other, the pocket H' is correspondingly enlarged, and as the said ends recede the size of said pocket is diminished, the pocket being thus adapted to receive cans varying in size.

Upon one side of the chute D' is provided the chute K' for the can-bottoms B', and this chute is provided with the pocket L' at its lower end for the reception of a single bottom B'. Upon the outer side of the chute K' is hinged the lever M' and the lever N', the former being provided with the finger O' and the latter with the finger P', which alternately engage the can-bottoms within the chute K' and prevent the can-bottoms from escaping too freely therefrom.

The levers M' N' operate simultaneously in view of the fact that the lower end of the lever M' is held in an eye formed in the lever N', as indicated in Figs. 6 and 13, the purpose of these levers being to cause the fingers O' P' to alternately engage or press against the can-bottoms during the passage of the latter to the pocket L'. The lever N' is operated by the clamping-heads F as they successively come into contact with the same, and since said fingers O' P' constitute familiar expedients for preventing the too rapid feeding of the heads or bottoms of cans it will be unnecessary to describe them or their operation more fully.

Upon the outer side of the chute K', beneath the lever N', is pivoted the plate $e''$, which prevents the can-bottoms after entering the pocket L' from falling outward and which, being pivotally secured, will turn upward under the contact of the clamping-heads F and permit said heads to freely clamp the can-bottoms after arriving at a position in line with the said pocket L'.

The can-bottoms and can-bodies being upon the chutes K' D' and the machine being set in motion, the clamping-heads F G will in succession be carried upward and stop in line with the pocket L' in the lower end of the chute K' and the pocket H' at the lower end of the chute D', at which time upon the wheels D E starting on their movement again the arm $b$ of the latch $a$ will be turned downward by its contact with the roller $d$, and the axle W and head G thus moved inward, thereby causing the head G to clamp the body and bottom of the can against the head F, in which condition, the wheels D E continuing their movement, the said can body and bottom will be lifted from the pockets H' L' and be carried to the seaming-rollers J K, by which the bottom will be double-seamed into the body of the can, as above described. The wheels D E have an intermittent motion and stop at every interval at which the clamping-heads F G come into line with the pockets H' L', and hence the removal of the bodies and bottoms from the chutes D' K' may be accomplished successfully. After the cans have been carried against the seaming-rollers J K the arm $b$ of the latches $a$ strikes the roller $e$ and rotates said latches from against the ends of the axles W, and thereby releases the cans. There being a series of the clamping-heads F G constantly removing the can bodies and bottoms from the chutes D' K' and carrying them to the seaming-rollers J K, the process of double-seaming the bottoms to the bodies may be carried on with great rapidity, and the clamping-heads being given a rapid revolution while in rigid contact with the cans the seaming may be accurately and effectually accomplished.

In the foregoing description the rollers J K, of well-known form for double-seaming, are referred to specifically; but it must be understood that the invention is not confined to any particular character or number of seaming-rollers, since the form and number of these will vary in accordance with the particular seam to be formed.

What I claim as my invention, and desire to secure by Letters Patent, is—

1. In a machine for seaming the end to the body of tin cans, the revoluble wheels D E, mounted on the horizontal shaft C and having journaled in their periphery the series of horizontal revoluble axles R W, carrying the clamping-heads F G, combined with mechanism, substantially as described, for causing the heads G to approach or recede from the heads F, gearing for imparting to said heads and the can-body clamped between them a rapid revolution independent of the intermittent movement of said wheels D E, chutes for feeding the can bodies and ends to the said clamping-heads, and seaming-rollers for folding the flanges of the can body and end, substantially as set forth.

2. In a machine for seaming the end to the body of tin cans, the wheels D E, mounted on the shaft C and having journaled in their periphery the series of axles R W, carrying the clamping-heads F G, the springs Y for forcing the heads G outward from the can-body, the pivoted latches $a$, carried by the wheel E, for locking the heads G against the can-bodies, and the contacts $d\,e$ for turning the latches $a$ at regular intervals, combined with chutes for feeding the can bodies and bottoms, mechanism, substantially as described, for imparting to said clamping-heads and the cans between them a rapid revolution on their own axes, and the seaming-rollers in the path of the flanges of the cans, carried by said clamping-heads, substantially as set forth.

3. In a machine for seaming the end to the body of tin cans, the revolving wheels D E, mounted on the shaft C and carrying, respectively, the axles R W, the series of clamping-heads F G, secured on said axles, the gearing for imparting a rapid revolution to said heads and the cans between them on their own axes, mechanism, substantially as described, for automatically causing the heads G to approach or recede from the heads F, and chutes for automatically feeding the can bodies and ends, combined with the rigid seaming-rollers for folding the flanges of said can-body and its end, substantially as set forth.

4. In a machine for seaming the end to the body of tin cans, the wheels keyed on the horizontal driving-shaft and carrying on their facing sides the series of clamping-heads F G, and mechanism, substantially as described, for automatically moving the heads G toward or from the heads F, combined with the belt-wheel loosely mounted on said shaft, the gear-wheel O, keyed to said belt-wheel, the pinions Q on the axles of the heads F and engaging said gear-wheel, the eccentric also keyed to said belt-wheel, mechanism, substantially as described, for imparting from said eccentric an intermittent motion to the driving-shaft and wheel-frames thereon, and the seaming-rollers, substantially as set forth.

5. The revoluble wheels D E, mounted on the horizontal shaft C and carrying upon their facing sides the series of revoluble clamping-heads F G, the latter being movable toward or from the former, combined with the chutes D' E' for feeding the can bodies and ends between the vertical faces of said heads, and the seaming-rollers J K for seaming the ends to the can-bodies, substantially as set forth.

6. The revoluble wheel-frames D E, carrying clamping-heads F G on their facing sides, the heads G being movable toward or from the heads F, combined with the chute D', having at its end the hinged arms E' F', forming the pocket H', substantially as set forth.

7. The revoluble wheels D E, having journaled in their periphery the axles R W, carrying the revoluble clamping-heads F G, the heads G being movable toward or from the heads F, combined with mechanism for imparting an intermittent motion to the said wheel-frames, the chutes D' K' for the can bodies and ends and having the pockets H' L' at their discharge end, and the seaming-rollers J K for double-seaming the ends to the can-bodies, substantially as set forth.

8. In tin-can machinery, the can-feeding chute D', having at its discharge end the hinged arms E' F', forming the pocket H', and provided with the spring I' and a stop J', substantially as set forth.

Signed at New York, in the county of New York and State of New York, this 20th day of May, A. D. 1890.

WILLIAM HIPPERLING.

Witnesses:
   CHAS. C. GILL,
   E. D. MILLER.